March 15, 1966     W. R. TRIPLETT     3,240,946
PHOTOELECTRIC READOUT OF INSTRUMENT MOVEMENT POSITION
Filed Feb. 23, 1962     2 Sheets-Sheet 1
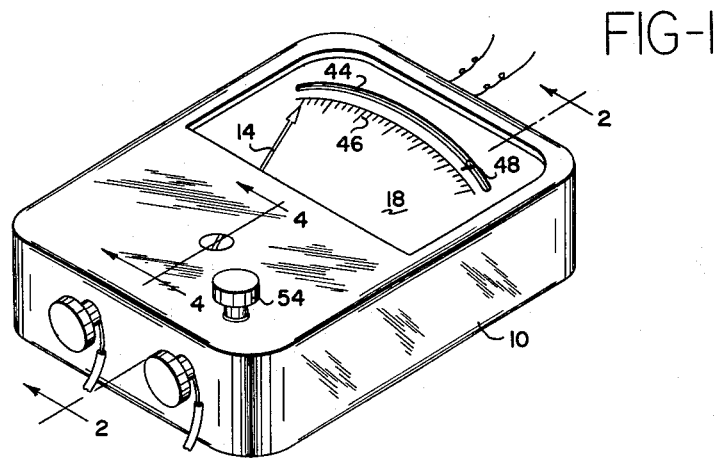
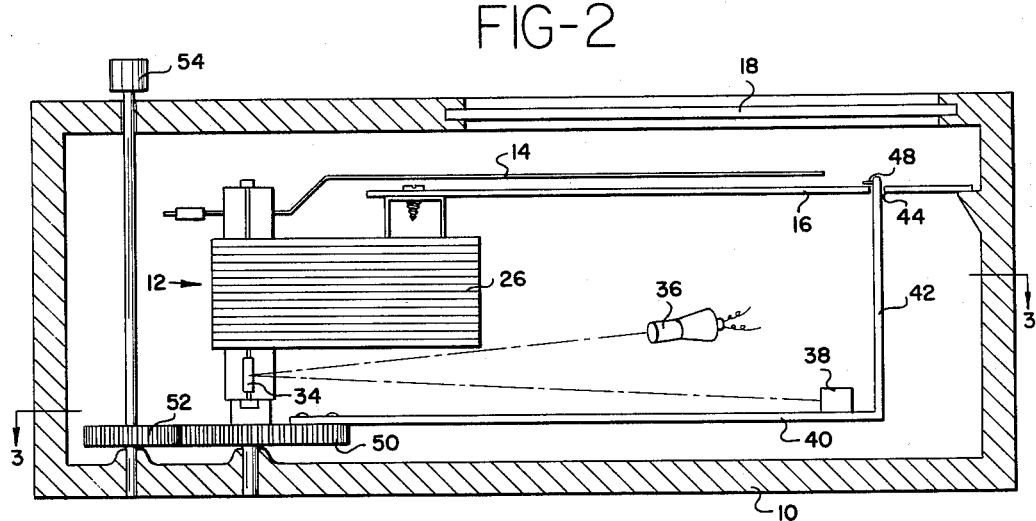
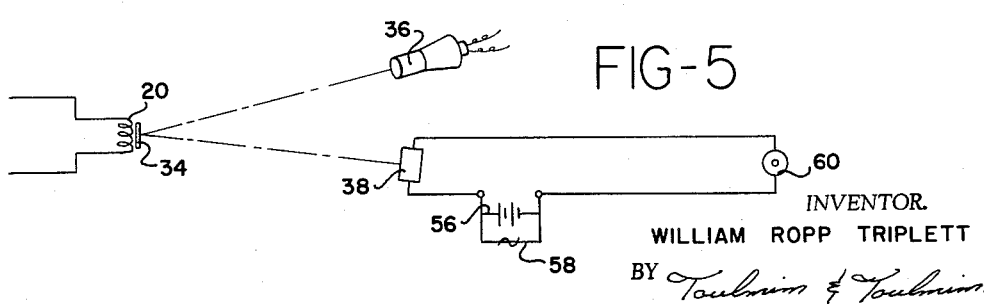
INVENTOR.
WILLIAM ROPP TRIPLETT
BY
ATTORNEYS March 15, 1966 W. R. TRIPLETT 3,240,946
PHOTOELECTRIC READOUT OF INSTRUMENT MOVEMENT POSITION
Filed Feb. 23, 1962 2 Sheets-Sheet 2

FIG-3

FIG-4

INVENTOR.
WILLIAM ROPP TRIPLETT
BY
ATTORNEYS

2

United States Patent Office 3,240,946
Patented Mar. 15, 1966

3,240,946
PHOTOELECTRIC READOUT OF INSTRUMENT MOVEMENT POSITION
William Ropp Triplett, Bluffton, Ohio, assignor to The Triplett Electrical Instrument Co., Bluffton, Ohio, a corporation of Ohio
Filed Feb. 23, 1962, Ser. No. 175,096
3 Claims. (Cl. 250—231)

This invention relates to a control instrument and a method of effecting control by such instrument and is particularly concerned with an electrical instrument arranged for effecting a control function.

Instruments, such as electrical instruments for effecting control functions, are generally known and usually comprise a measuring mechanism such as an instrument movement and means are provided, such as switch contacts or the like, that are closed when the moving element of the instrument reaches a predetermined point. Devices of this nature have the disadvantage that, in order to obtain sufficient contact pressure, it is usually necessary to associate magnets or the like with the contacts which will pull them together when they reach a certain condition of proximity.

This, of course, makes the exact point to which the moving element must be moved to bring the contact elements together somewhat indefinite and likewise imposes a load on the moving element that detracts from its sensitivity.

Attempts have been made to unload the moving element, such as employing a light beam that is moved by movement of the movable element and which light beam falls on a photosensitive element such as a photocell thereby activating a control circuit.

Instruments of the last mentioned nature unload the moving element so that the position which it occupies is in exact accordance with the stimulus supplied thereto that is thereby measured, but either a photocell or a photovoltaic element actuated by a light beam requires in circuit therewith amplifier means before sufficient power becomes available for operating relays or other circuit elements.

It is in particular connection with the elimination of auxiliary circuit components, such as amplifiers or the like in an instrument of this nature that the present invention is concerned. Specifically, the present invention proposes to employ a light sensitive element in combination with an instrument movement and which light sensitive element releases sufficient power that it can operate a relay of substantial size directly or so that it can supply sufficient power to actuate directly an electric motor or a heating element or the like.

The control instrument according to the present invention is thus much more inexpensive to manufacture than the instruments according to the prior art, and is easier to service and maintain.

A particular light sensitive element has been recently developed and is known as a silicon controlled rectifier. A rectifier of this nature is a semi-conductor, similar to a transistor, and is light sensitive and is characterized in that it will control relatively large amounts of power in one direction when illuminated.

It is contemplated that the instrument according to the present invention will be adjustable and, to this end, the light sensitive element is adjustably mounted in the instrument so that it can come under the influence of the light beam emanating from the movable element of the instrument movement at any predetermined point.

The exact nature of the control instrument according to the present invention will become more apparent upon reference to the following specification taken in connection with the accompanying drawings in which:

FIGURE 1 is a rather diagrammatic plan view of an instrument constructed according to my invention;
FIGURE 2 is a vertical sectional view thereof indicated by line 2—2 on FIGURE 1;
FIGURE 3 is a plan section view indicated by line 3—3 on FIGURE 2;
FIGURE 4 is a sectional view indicated by line 4—4 on FIGURE 1 showing the movable element of the instrument and the support therefor; and,
FIGURE 5 is a diagrammatic representation of a typical electric circuit utilizing the instrument according to the present invention.

Referring to the drawings somewhat more in detail, and in particular reference to FIGURES 1 through 4, the control instrument comprises a case 10 within which there is mounted an instrument movement generally designated at 12. This movement includes a pointer 14 that sweeps over a graduated dial 16 that is visible through sight glass 18 that forms a part of the case 10.

The exact nature of the instrument movement is not important and, purely for the purpose of illustration, a d'Arsonval movement is illustrated in which, as will be seen in FIGURE 4, a coil bobbin 20 is mounted on support shafts 22 and 24 for rotation in a magnetic field provided by the magnetic frame 26 that includes a core 28 inside bobbin 20.

Electric current is supplied to the coil on coil bobbin 20 by way of wires 29 to which the current is led through hair springs 30 and the metal anchors 32 of the hair springs.

As will be also seen in FIGURE 4, the movable element of the instrument, in this case, the coil bobbin 20, has attached thereto a mirror 34. This mirror is for the purpose of reflecting a light beam from a light source to a light sensitive element. Such a light source will be seen at 36 in FIGURES 2 and 3 and this source comprises a source of illumination such as a light bulb and suitable lens means for directing a straight beam of light of predetermined area toward mirror 34. This light beam reflects from mirror 34, as will also be seen in FIGURE 2 and 3 toward the silicon controlled rectifier element 38. Element 38 is mounted on an arm 40 which has an end part 42 extending upwardly through a slot 44 formed in dial plate 16 adjacent the graduations 46. The exact position of the arm can thus be readily determined by observation of the position of the upper end 48 thereof relative to the graduations of the dial.

Arm 40 at its other end is attached to a gear 50 rotatably supported in the casing and meshing with a smaller gear 52 also rotatably supported in the casing and having a shaft extending through the top of the casing and carrying an adjusting knob 54. It will be evident that rotation of adjusting knob 54 will permit adjustment of arm 40 thereby to position light sensitive element 38 in any desired angular position, within the limits of the movement of the arm about the instrument movement.

It will be noted that the gear 50 is preferably mounted so that its center of rotation coincides with the center of rotation of the movable element of the instrument so that in all adjusted positions of the arm, the light sensitive element is located in exactly the same position with respect to the said movable element except with reference to the angle therebetween.

If the position of the arm is to coincide exactly with the scale reading at which a control function is to be initiated, the light source 36 is mounted on the arm to move therewith. By so arranging the light source in a fixed position relative to the light sensitive element, it will be evident that the same conditions will always obtain with respect to the relative position of the movable element of the instrument in order to reflect the light from the light source back to the light sensitive element.

Should it be desired to mount the light source stationarily within the instrument, the graduations of the dial cannot be employed to indicate the position of arm 40 at which the control function will be initiated and there would have to be, instead, other graduations provided on the dial to indicate that point. This would come about because with the light source stationary, the beam reflected by the mirror on the movable element would sweep across the casing faster than the instrument pointer.

Turning now to FIGURE 5, this shows an electric circuit arrangement such as might be used with an instrument according to the present invention. In this circuit, the light sensitive element 38 is connected in circuit with a source of electrical energy such as a battery 56 or an alternating current cource 58. In series with the source of electric power and the light sensitive element 38 is a load 60 which might be a relay or, according to the present invention, might be a direct load such as a motor, or a heating element, or a solenoid actuator. The light sensitive element 38, which has been referred to as a silicon controlled rectifier, can release sufficient amounts of power in one direction of movement of current therethrough when light is actuated to actuating motor or heating element or solenoid actuator directly.

All intermediate amplifier arrangements are thus eliminated and extremely inexpensive, but a highly accurate control instrument is, therefore, provided by the present invention.

It will, of course, be understood that more than one sensitive light element could be employed located at different positions in the casing so that a plurality of control functions could be initiated by the control instrument, if so desired.

It will be understood that this invention is susceptible to modification in order to adapt it to different usages and conditions; and, accordingly, it is desired to comprehend such modifications within this invention as may fall within the scope of the appended claims.

I claim:
1. In a control instrument; an electrical instrument movement having a rotatable element, a light sensitive element which is conductive when illuminated and substantially non-conductive when not illuminated, a radially extending arm supporting said light sensitive element for movement about the axis of rotation of said rotatable element, a mirror located on the axis of rotation of said rotatable element, a light source projecting a beam of light to the mirror, said beam of light reflecting from the mirror to said light sensitive element outwardly along a radial direction in a predetermined rotated position of said rotatable element depending upon the position of said arm, a source of electrical energy, and a load to be actuated by said source of electrical energy and connected directly in series therewith and with said light sensitive element, said light sensitive element consisting of a silicon controlled rectifier and being the sole means for controlling the flow of energy to said load.

2. In a control instrument; an electrical instrument movement having a rotatable element, a light sensitive element which is conductive when illuminated and substantially non-conductive when not illuminated, a radially extending arm supporting said light sensitive element for movement about the axis of rotation of said rotatable element, a mirror located on the axis of rotation of said rotatable element, a light source projecting a beam of light to the mirror, said beam of light reflecting from the mirror to said light sensitive element outwardly along a radial direction in a predetermined rotated position of said rotatable element depending upon the position of said arm, a source of electrical energy, and a load to be actuated by said source of electrical energy and connected directly in series therewith and with said light sensitive element, a pointer attached to said rotatable element, a dial over which the pointer sweeps, means on the arm adjacent said dial for observation of the position of the arm, and means for adjusting the position of the arm, said light source also being carried by said arm to move therewith, said light sensitive element consisting of a silicon controlled rectifier and being the sole means for controlling the source of energy to said load.

3. In a control instrument; a casing, an electrical instrument movement in said casing having a rotatable element, a light sensitive element in said casing which is conductive when illuminated and substantially non-conductive when not illuminated, a radially extending arm in said casing supporting said light sensitive element for movement about the axis of rotation of said rotatable element, a mirror located on the axis of rotation of said rotatable element, a light source projecting a beam of light to the mirror, said beam of light reflecting from the mirror to said light sensitive element outwardly along a radial direction in a predetermined rotated position of said rotatable element depending upon the position of said arm, a source of electrical energy, and a load to be actuated by said source of electrical energy and connected directly in series therewith and with said light sensitive element, a pointer attached to said rotatable element, a dial in said casing over which the pointer sweeps, means on the arm adjacent said dial for observation of the position of the arm, a first gear in the casing rotatable on the axis of rotation of said rotatable element and to which said arm is fixedly attached, and a second gear in the casing meshing with said first gear and including means thereto and accessible from externally of said casing for rotating said gears to adjust the position of said arm, said light sensitive element consisting of a silicon controlled rectifier and being the sole means for controlling the source of energy to said load.

References Cited by the Examiner
UNITED STATES PATENTS

| 2,046,005 | 6/1936 | Sprecker | 250—230 X |
| 2,067,613 | 1/1937 | McMaster | 250—215 X |
| 2,142,602 | 1/1939 | Blethen | 250—231 |
| 2,236,255 | 3/1941 | Young | 250—231 |
| 2,329,715 | 9/1943 | Grier | 250—215 |
| 2,860,219 | 11/1958 | Taft et al. | 317—240 X |
| 3,048,797 | 8/1962 | Linder | 250—211 X |

RALPH G. NILSON, *Primary Examiner.*

WALTER STOLWEIN, *Examiner.*